March 18, 1941.                C. E. WISE                2,235,061
                         LAWN MOWER CUTTER BAR
                          Filed Jan. 2, 1940
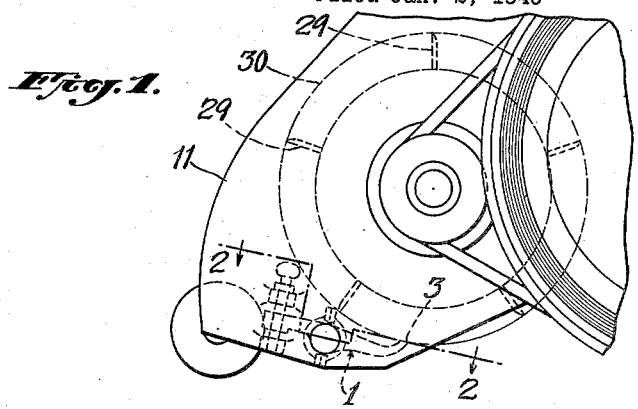
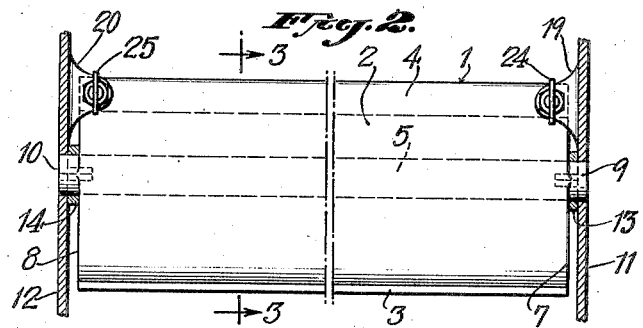
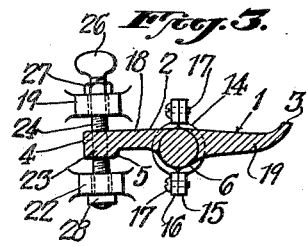
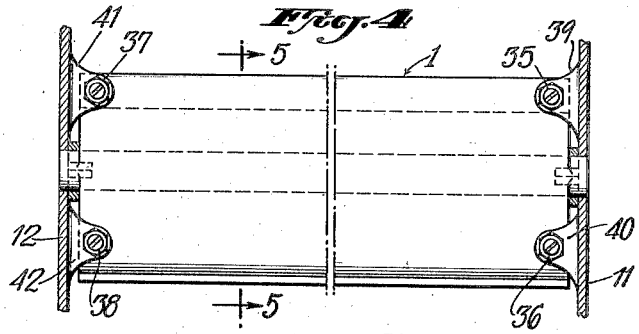
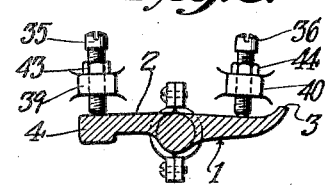
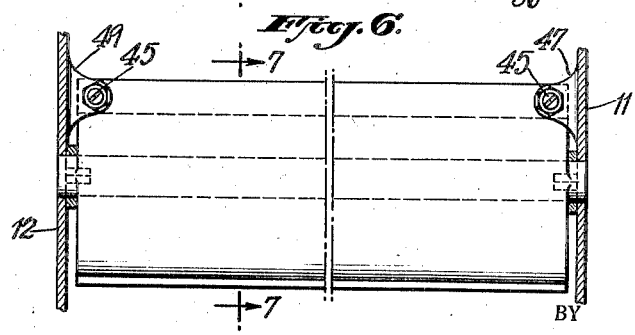
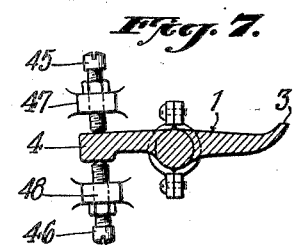
INVENTOR.
CLARENCE E. WISE.
BY
ATTORNEYS Patented Mar. 18, 1941

2,235,061

UNITED STATES PATENT OFFICE 2,235,061

LAWN MOWER CUTTER BAR

Clarence E. Wise, Pittsburgh, Pa., assignor to Crucible Steel Company of America, New York, N. Y., a corporation of New Jersey Application January 2, 1940, Serial No. 312,042

2 Claims. (Cl. 56—294)

This invention relates to lawn mowers, and more particularly to cutter bars therefor, and to means of mounting and adjusting the same, and its principal object is to provide a cutter bar consisting exclusively of a single piece of metal, such as a piece of rolled or drawn steel.

Heretofore, lawn mower cutter bars, also referred to as stationary or under knives, have always comprised an assemblage of several metal members riveted, welded or otherwise integrated into a unitary assemblage. In one typical modification heretofore employed, this assemblage comprises a relatively thin cutting blade of steel, having insufficient rigidity of itself to serve as a cutter bar, and which is therefore riveted, welded or otherwise affixed to a cast iron reinforcing member. In another modification, the assemblage comprises a rolled steel cutting member provided on its under side with a central reinforcing rib and welded at its ends, for purposes of the additional reinforcing required, to end plates of cast steel or the like. Such constructions and others heretofore employed are either heavy or bulky and hence add unduly to the weight of the mower and the effort required for manipulation; or if made lighter, do not have sufficient stiffness and rigidity. Also they are costly initially and as to replacement, since injury to the blade necessitates replacing the entire assemblage. Moreover, the constant vibration to which the mower is subjected in service tends to loosen up the welding, riveting or other means of integrating the members, in consequence of which the mower will not function properly and becomes inefficient and noisy.

My invention provides a truly one-piece cutter bar consisting exclusively of a single piece of metal, namely, a section of hot rolled or cold drawn steel, preferably wrought steel, which is relatively long and wide in comparison with its thickness, which is comparatively flat on its upper surface and turned up along one edge to provide a cutting edge, and which is provided on its under face with a plurality of spaced, longitudinally extending, reinforcing ribs, preferably two in number, and disposed respectively along the trailing edge and at an intermediate distance between the cutting and trailing edges, preferably corresponding approximately to the center of gravity of the bar considered in cross section. The thickened portion of the bar provided by the intermediate or central rib, projects beyond the opposite ends of the bar proper to provide mounting lugs which are machined to circular section for pivotally supporting the cutter bar in appropriate journal housings forming part of the lawn mower framework which carries the cutting reel.

For rotatably adjusting the cutter bar in relation to the cutting reel, i. e. for elevating or depressing the cutting edge of the bar with respect to the rotary knives of the reel, screw-threaded adjusting means are provided in accordance with a further aspect of the invention, and comprising bolts, provided with lock nuts, threaded through appropriately disposed lugs on the framework and also through threaded eyelets in the trailing edge of the cutter bar, or alternatively, these bolts may be arranged to merely bear against the cutter bar, for locking it in a desired position of rotative adjustment. Where the latter expedient is employed, adjusting bolts may be provided which bear against both the upper and lower faces respectively of the cutter bar along its trailing edge, or alternatively, which bear only against the upper face of the cutter bar adjacent both the cutting and trailing edges respectively.

The cutter bar, under knife or stationary knife for lawn mowers, according to the invention, is accordingly a truly one-piece unit, easy to make, as by rolling or drawing, and which involves no riveting, welding or other assembling that might loosen up in service. The bar can be easily assembled into lawn mowing machines. Its construction, shape and novel mode of mounting in accordance with the invention as above described, are such that the cutting edge can be easily and quickly adjusted and maintained in position to provide a desired cutting pressure or contact with the revolving cutting or wiper knives of the cutting reel. The cutter bar is so designed and constructed by virtue of its reinforcing ribs referred to, that it does not require the attachment thereto, as by welding, riveting, etc., of additional reinforcing members, such as the cast iron or cast steel end or base plates required in prior constructions for imparting the necessary stiffness, rigidity and strength, as well as for purposes of mounting in the lawn mower framework. According to my invention, the extensions of the central rib beyond the ends of the cutter bar proper provide suitable axle or bearing members for mounting in the lawn mower framework, which bearing members are part of the single piece of material constituting the cutter bar proper. My construction provides stiffness and rigidity along the cutting edge by virtue of its turned-up contour, and also through the center of the bar and along the trailing edge thereof by virtue of the reinforcing ribs.

Referring now to the drawing:

Fig. 1 is a partial side elevation of a lawn mower showing my improved cutter bar attached thereto in accordance with the novel mounting and adjusting arrangement of my invention;

Fig. 2 is a section at 2—2 of Fig. 1; and Fig. 3, a section at 3—3 of Fig. 2, Figs. 2 and 3 further illustrating one arrangement in accordance with my invention for rotatably adjusting the cutter bar in relation to the cutting reel; while Figs. 4 and 6 and 5 and 7 are views similar to Figs. 2 and 3 respectively, but illustrative of modified arrangements for rotatably adjusting the cutter bar in relation to the cutting reel.

Referring more particularly to Figs. 1 to 3 inclusive, the cutter bar 1 comprises, as shown, a single piece of hot rolled or cold drawn steel, which is relatively long and wide, as shown in Fig. 2, in comparison with its thickness, as shown in Fig. 3. The upper surface 2 of the bar is comparatively flat, as shown, and the bar is turned up along one longitudinal edge to provide a cutting edge 3, the opposite or trailing edge 4 being abruptly thickened to provide on its lower surface a reinforcing rib 5. Also the bar is provided with a thickened portion 6 at a position intermediate its cutting and trailing edges 3, 4, corresponding preferably to approximately the center of gravity of the bar, considered in cross section, this thickened portion 6 providing on the under face of the bar an approximately central and longitudinally extending reinforcing rib as shown. For purposes of pivotally mounting the cutter bar in the lawn mower framework, this thickened, central portion or rib 6, is extended beyond the opposite ends 7, 8 of the bar proper to form projecting lugs 9, 10, which are machined to circular section, and journaled into frame plates 11, 12 of the mower. For maintaining the cutter bar in assembly with the frame plates as shown in Fig. 2, and for permitting disassembly thereof when required, split washers 13, 14 are provided and disposed about lugs 9, 10 and between the ends 7, 8 of the cutter bar and the frame plates 11, 12. These split washers, as shown more clearly in Fig. 3, comprise semi-circular members provided with threaded projecting lugs, such as 15, 16, and held together by screws, such as 17, threaded through the lugs. The cutter bar is made of diminished and substantially uniform thickness in the portion 18 intermediate the central rib 6 and rib 5 along the trailing edge. Also the bar is of gradually diminishing thickness in the portion 19 extending from the central rib 6 to the cutting edge 3.

For purposes of rotatably adjusting the cutter bar about the axis of its supporting lugs 9, 10, the frame plates 11, 12 are provided with inwardly projecting lugs, such as 19 to 22, inclusive, disposed adjacent the trailing edge 4 of the cutter bar and above and below the same respectively, as shown. These lugs are provided with aligned threaded apertures as is also the trailing edge of the cutter bar, the latter as indicated at 23, through which bolts 24, 25 are threaded, such that the bolts pass seriatim through the upper frame plate lug, the cutter bar and the lower frame plate lug. These bolts are provided at their upper ends with hand lugs, as shown at 26, and also with lock nuts, as shown at 27, 28, disposed respectively above and below the upper and lower frame plate lugs. By loosening up the lock nuts and turning the bolts, by means of the hand lugs, to the right or left as desired, the cutter bar may be rotated about its bearing supports 9, 10, to elevate or depress the cutting edge 3 as desired.

The cutter bar is so mounted between the frame plates, as shown in Fig. 1, that its cutting edge 3 wipes against the rotary knives 29 of the cutting reel 30. By means of the adjusting bolts 24, 25 referred to, the cutting edge 3 of the cutter bar may be adjusted as described to bear against the rotary knives 29 with any degree of pressure desired.

In the modification of Figs. 4 and 5, rotative adjustment of the cutter bar is provided by means of screws 35 to 38 inclusive, threaded respectively through lugs 39 to 42 inclusive forming part of the frame plates 11 and 12 as shown, these screws being provided with lock nuts, such as 43, 44, and in this instance, merely bearing against the upper face 2 of the cutter bar adjacent the cutting and trailing edges 3, 4 respectively. Thus, by tightening up the screws bearing on the trailing edge while at the same time loosening up the screws adjacent the cutting edge, or vice versa, the cutter bar may be elevated or depressed to any position of adjustment desired.

The modification of Figs. 6 and 7 is similar in principle to that of Figs. 4 and 5, except that in this case, the adjusting screws, such as 45 and 46, bear against the upper and lower faces respectively at the trailing edge of the cutter bar. These screws are threaded through lugs, such as 47, 48, 49 carried by the frame members 11, 12, and disposed above and below the cutter bar respectively.

I claim:

1. A cutter bar for lawn mowers comprising, a single piece of rolled or drawn steel, which is relatively long, wide, thin and comparatively flat on its upper surface, one edge being turned up into a cutting edge with the opposite trailing edge abruptly thickened to provide a reinforcing rib on its lower surface, said bar being also thickened at about its transverse center of gravity to provide on its lower face a reinforcing rib projecting beyond the opposite ends of the bar in the form of cylindrical lugs for rotatably mounting the bar, said bar being of diminished and substantially uniform thickness between said ribs, and gradually diminishing in thickness from the thickened intermediate rib to said cutting edge.

2. In a lawn mower and combination, a supporting frame, a cutting reel rotatably mounted therein, a cutter bar cooperating with said reel and made of a single piece of rolled or drawn steel, which is relatively long, wide, thin and comparatively flat on its upper surface, one edge being turned up into a cutting edge with the opposite trailing edge abruptly thickened to provide a reinforcing rib on its lower surface, said bar being also thickened at about its transverse center of gravity to provide on its lower face a reinforcing rib projecting beyond the opposite ends of the bar in the form of cylindrical lugs for rotatably mounting the bar, said bar being of diminished and substantially uniform thickness between said ribs and gradually diminishing in thickness from the thickened intermediate rib to said cutting edge, said lugs being journalled into said supporting frame for rotatably supporting said bar, and screw-threaded adjusting means carried by said frame and engaging at least the trailing edge of the cutter bar, for rotatably adjusting said bar in relation to said cutting reel.

CLARENCE E. WISE.